Dec. 6, 1949  L. A. KISCH  2,490,635
COMBINED STRAINER AND MAGNETIC SEPARATOR
Filed Nov. 29, 1946
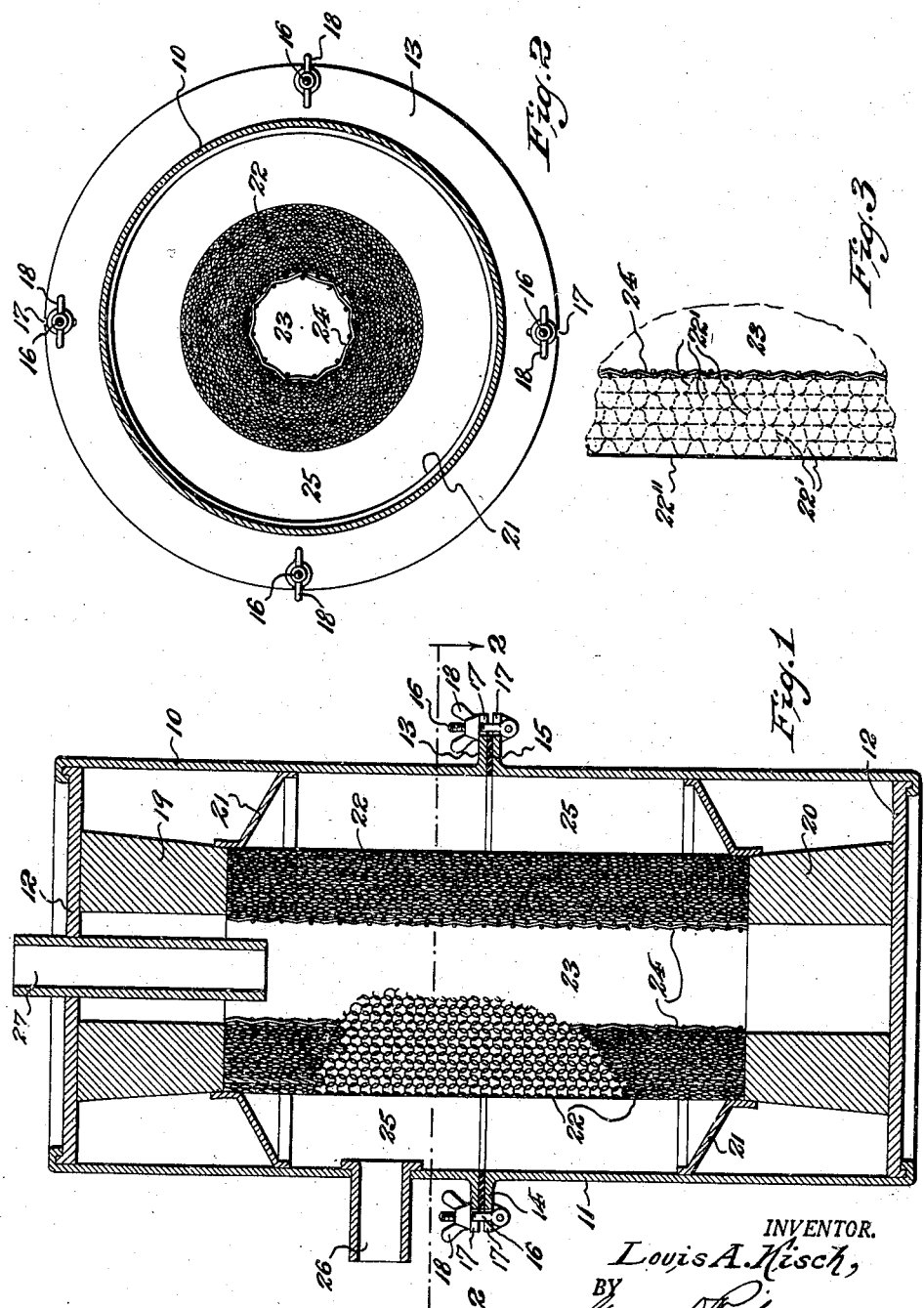
INVENTOR.
Louis A. Kisch,
BY George D. Richards
Attorney, Patented Dec. 6, 1949

2,490,635

UNITED STATES PATENT OFFICE 2,490,635

COMBINED STRAINER AND MAGNETIC SEPARATOR

Louis A. Kisch, Little Falls, N. J.

Application November 29, 1946, Serial No. 712,962

6 Claims. (Cl. 210—1.5)

This invention relates to improvements in strainer apparatus for separating suspended solid particles from a liquid passed therethrough; and the invention has reference, more particularly, to a combined strainer and magnetic separator whereby both non-magnetic and magnetic particles suspended in a liquid passed therethrough are separated from the liquid.

This invention has for an object to provide a novel construction of combined strainer and magnetic separator through which a liquid to be treated is passed, and which is effective to remove from said liquid both non-magnetic and magnetic particles which may be suspended in and carried by the liquid, whereby the discharged liquid is clarified and cleansed for initial or repeated use; and, to this end, the apparatus is, among other uses, especially well adapted for service in liquid circulating apparatus employed in connection with machine tools to serve cooling, lubricating or other treating liquid to an operating tool and the material worked thereby, so that the liquid thus circulated may be freed from any content of ferrous or other magnetic metallic particles, as well as from lint, sand, grit, non-magnetic particles and other foreign substances, whereby only clean liquid will be carried back to the operating tool.

The invention has for another object to provide a novel construction of combined strainer and magnetic separator which includes a magnetizable foraminous strainer body and means for magnetizing the same; said strainer body providing an interstitial mass pervious to liquid but adapted to arrest movement of solid particles therethrough, and which, when magnetized, will attract and adherently retain even the finest particles of magnetic metal, thereby, not only separating the latter from the liquid, but so combining or incorporating the same in the interstitial strainer body mass as to increase the straining efficiency thereof.

The invention has for a further object to provide a novel construction of combined strainer and magnetic separator which comprises a casing or housing having liquid intake and discharge means, and a magnetizable foraminous strainer body interposed between said intake and discharge means; said housing or casing comprising separable sections equipped with magnetic means to engage and magetize said strainer body, but from which the latter may be easily disengaged when the casing or housing sections are separated, so that removal of the strainer body for cleaning or replacement may be quickly and easily accomplished.

Other objects of this invention, not at this time more particularly enumerated, will be understood from the following detailed description of the same.

An illustrative embodiment of this invention is shown in the accompanying drawings, in which—

Fig. 1 is a vertical longitudinal sectional view of the combined strainer and magnetic separator according to this invention; the strainer body being shown in elevation in part; Fig. 2 is a horizontal sectional view, taken on line 2—2 in Fig. 1; and Fig. 3 is a fragmentary longitudinal sectional view of a modified form of the strainer body.

Similar characters of reference are employed in the above described views, to indicate corresponding parts.

The illustrative form of combined strainer and magnetic separator as shown comprises a casing or housing formed by an upper section 10 and a lower section 11, the outer ends of which are closed by end walls 12. The inner open ends of said sections 10 and 11 are respectively provided with externally projecting annular flanges 13 and 14 which, when the sections are assembled, oppose each other in engagement with a suitable sealing gasket 15 interposed therebetween. Suitable means is provided for releasably joining said sections 10 and 11 in operative assembled relation. Illustrative of one form of such means, as shown, the same comprises a series of screw-threaded clamp bolts 16 which are pivotally connected to one of the flanges, as e. g. the flange 14, so as to be capable of being upswung through indenting notches 17—17 with which said flanges 14 and 13 are respectively provided. Threaded on the free end portions of the clamp bolts 16 are thumb nuts 18 which, when screwed home on said bolts, draw the flanges 13 and 14 together and into compressing relation to the interposed gasket 15, thus not only securing the casing or housing sections together in operative assembled relation, but also in manner to seal the joint therebetween with leak-proofing effect.

Suitably affixed to the interior side of the end wall 12 of the housing or casing section 10 is an annular magnet body 19 disposed concentric to the longitudinal axis of the housing or casing interior; and, in like manner, affixed to the interior side of the end wall 12 of the housing or casing section 11 is a like annular magnet body 20 disposed concentric to the longitudinal axis of the housing or casing interior, and consequently in longitudinally spaced aligned relation to said magnet body 19. Surrounding the inner end portion of each magnet body is an annular partition and strainer body seating member 21, which extends to and is suitably secured to the adjacent casing or housing section wall, the same being preferably made of brass or other non-magnetic material.

Extending between the magnet bodies 19 and 20 is a foraminous strainer body 22 which is of tubular form so as to provide an internal axial passage 23, and which is of substantial wall thickness, whereby to provide an interstitial mass of substantial volume adapted to furnish the desired strainer capacity. Said strainer body is made up of convolved plies of knitted mesh produced from steel or iron wire or other suitable magnetizable metal. The knitted mesh plies of said strainer body are wound about a perforate and substantially rigid central tubular sleeve 24, whereby the same is firmly supported against distortion or collapse. Preferably said perforate supporting sleeve 24 is made of square woven metallic mesh material.

When the strainer body 22 is in place within the joined housing or casing sections 10 and 11, the ends of said body are respectively embraced by the respective strainer body seating members 21, so that the strainer body extends axially between the magnet bodies 19 and 20 in end to end abutting contact therewith. As so related to the magnet bodies, the magnetizable material of the strainer body becomes magnetized by its contact with the magnet bodies 19 and 20, and therefore capable of attaching and holding to itself any free magnetizable particles moving in the vicinity thereof.

Connected with one of the housing or casing sections, as e. g. the section 10, to enter through the side thereof, and to communicate with the annular receiving chamber 25, which surrounds the strainer body 22 intermediate the partition members 21, is a liquid intake means 26 through which liquid to be treated may be introduced into the strainer apparatus.

Connected with and extending through an end wall 12 of at least one of the housing or casing sections, as e. g. the section 10, is a liquid discharge means 27 which communicates with and leads outwardly from the internal axial passage 23 of the strainer body 22, whereby strained and clarified liquid, which has been treated by the latter, may be discharged from the strainer apparatus. Said discharge means 27 is preferably formed by a tube or pipe of brass or other non-magnetic metal.

In operation of the strainer apparatus, the liquid to be treated is introduced into the housing or casing receiving chamber 25 so as to surround the external side of the strainer body 22. The liquid thus entered is compelled to pass radially through the interstitial mass of the strainer body 22 before it can reach the discharge means 27. As the liquid passes through said interstitial mass the suspended non-magnetic particles or foreign matter carried thereby is caught by the strainer body and onward progress thereof arrested, whereby to be separated from the liquid. Any magnetic particles suspended in the liquid, even if fine enough to penetrate the interstices of the strainer body, will be magnetically attracted to and held by the magnetized metallic material of the strainer body, and will therefore be likewise arrested and separated from the liquid. The liquid as thus clarified by its passage through the interstitial mass of the strainer body, escapes from the latter into the central internal axial passage 23 with which the strainer body is provided, and may thence be discharged from the strainer apparatus through the communicating discharge means 27.

It will be understood that the knitted mesh fabric composed of magnetizable material may be knitted in any selected knit loop size calculated to provide the degree of interstitial porosity which may be desired in any given case. It will also be understood that the density of the strainer body may be varied in desired locations or areas of the mass thereof. For example, the outer ply or plies of the knitted mesh material may be of finer loop size than that of inner plies; or the selected plies may be deformed. An example of variations of such general character is shown in Fig. 3, wherein the interior mass of strainer body is formed by superposed and convolved corrugate plies 22' the corrugations of which are obliquely disposed, and contiguous plies so related that the corrugations of one ply cross those of the adjacent ply; the interior mass thus formed being jacketed by an outer ply or plies 22" of very fine mesh formation. Other variations in the specific form and structure of the strainer body as comprised of convolved knitted mesh material are possible and may be utilized as may be expedient in any given case. For example, the outer ply or plies may be formed of composite mesh, i. e. a mash produced from combined metallic and vegetable yarn strands, or even from the latter alone.

From the above and inspection of the drawings it will be seen, that the novel construction of strainer apparatus may be easily dismantled, when occasion requires, by releasing and separating the housing or casing sections 10 and 11, whereby the strainer body 22 may be easily withdrawn from the assembly for cleaning or replacement.

While as shown the magnetic members are of the permanent magnet type, it will be understood that they may be of electro-magnetic type if desired.

Having now described my invention, I claim:

1. A combined strainer and magnetic separator apparatus comprising a closed casing, magnetic members mounted respectively at and within the ends of said casing, a foraminous strainer body of tubular form axially disposed within said casing with its respective ends in abutting contract with said respective magnetic members, said strainer body, being made of magnetizable material whereby to be magnetized by said magnetic members, transverse partition members respectively extending from ends of said strainer body which abut the respective magnetic members to the sides of said casing to form an annular chamber surrounding the strainer body, the casing having a liquid inlet communicating with said chamber whereby the latter serves to direct the liquid flow radially inward through the strainer interstices into the internal passage of the strainer, and means connected with the casing in communication with the internal passage of said tubular strainer body for discharging liquid which has traversed the latter.

2. A combined strainer and magnetic separator apparatus as defined in claim 1 wherein the strainer body is formed by a plurality of convolved superposed plies of knitted ferrous metallic wire mesh.

3. A combined strainer and magnetic separator apparatus comprising a closed casing formed by separable end to end adjoined sections having interposed sealing means and means to releasably secure the same in closed together and sealed relation, a magnetic member mounted within each end section of said casing in directly opposed and spaced relation to the magnetic member in the other section, a foraminous strainer body of tubular form axially disposed within said casing with its respective ends in abutting contact with the respective magnetic members and bridging the joint between the casing sections, said strainer body being made of magnetizable metallic material whereby to be magnetized by said magnetic members, transverse partition members respectively extending from ends of said strainer body which abut the respective magnetic members to the sides of the casing to form an annular chamber surrounding the strainer body, the casing having a liquid inlet communicating with said chamber whereby the latter serves to direct the liquid flow radially inward through the strainer interstices into the internal passage of the strainer, and means connected with the casing in communication with the internal passage of said tubular strainer body for discharging liquid which has traversed the latter.

4. A combined strainer and magnetic separator apparatus as defined in claim 3 wherein the strainer body is formed by a plurality of convolved superposed plies of knitted ferrous metallic wire mesh.

5. A combined strainer and magnetic separator apparatus comprising a cylindrical casing having end walls, a co-acting pair of annular magnetic members affixed to the respective end walls of the casing in co-axial alignment with each other and in relation to the casing, a tubular foraminous strainer of magnetizable material interposed between adjacent faces of and in aligned relation to the said magnetic members with its ends abutting said faces, the strainer being substantially equal in external diameter to the magnetic members, an annular partition of non-magnetic material fitting the side walls of the casing substantially in the plane of the abutment between each end of the strainer and the corresponding magnetic member with its inner peripheral edge shaped to form a coupling for the meeting portions of strainer and magnetic member whereby the two partitions establish alignment of the strainer and both magnetic members and define an annular chamber surrounding the strainer, a fluid inlet means provided in the casing in communication with the said chamber to direct the fluid flow radially inward through the strainer interstices, and a fluid outlet means provided in one end wall of the casing in communication with the internal passage of the strainer through the interior of the corresponding magnetic member.

6. A combined strainer and magnetic separator apparatus as defined in claim 5 wherein the fluid outlet means includes a tube of non-magnetic material which projects through the interior of the said magnetic member and beyond the plane of junction with the contiguous end of the strainer.

LOUIS A. KISCH.

REFERENCES CITED

The following references are of record in the file of this patent:

UNITED STATES PATENTS

| Number | Name | Date |
|---|---|---|
| 1,425,366 | Chapman | Aug. 8, 1922 |
| 1,566,088 | Greene | Dec. 15, 1925 |
| 1,806,002 | Sims et al. | May 19, 1931 |
| 2,149,764 | Frei | Mar. 7, 1939 |
| 2,317,774 | Kiek et al. | Apr. 27, 1943 |
| 2,392,624 | Tunis | Jan. 8, 1946 |
| 2,430,157 | Byrd, Jr. | Nov. 4, 1947 |
| 2,437,221 | Cox et al. | Mar. 2, 1948 |